Sept. 29, 1925.

J. McC. EDWARDS 1,554,992

RESILIENT BEARING

Filed Sept. 23, 1922

Inventor,
J. McC. Edwards, by
G. C. Kennedy,
Attorney.

Patented Sept. 29, 1925.

1,554,992

UNITED STATES PATENT OFFICE.

JAMES McCOSH EDWARDS, OF BLACK HAWK COUNTY, IOWA, ASSIGNOR TO ASSOCIATED MANUFACTURERS COMPANY, OF WATERLOO, IOWA.

RESILIENT BEARING.

Application filed September 23, 1922. Serial No. 590,163.

*To all whom it may concern:*

Be it known that I, JAMES McCOSH EDWARDS, a citizen of the United States of America, and a resident of Black Hawk County, Iowa, have invented certain new and useful Improvements in Resilient Bearings, of which the following is a specification.

My invention relates to improvements in resilient bearings, and the object of my improvements is to supply a neck-bearing particularly for use for receiving a spindle of a centrifugal liquid separator bowl, and including an improved elastic member for resiliently cushioning the spindle bushing.

Figure 1:
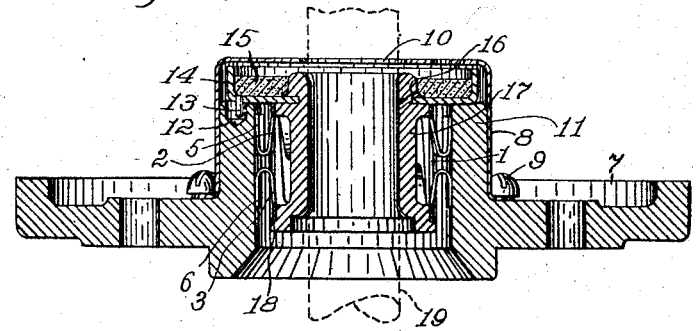
Figure 2:
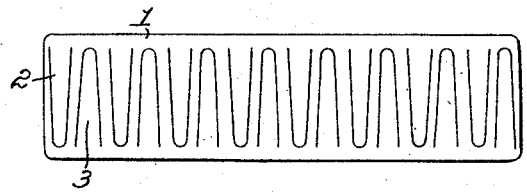

I have accomplished this object by the means which are hereinafter described and claimed, and which are illustrated in the accompanying drawings, in which Fig. 1 is a vertical transaxial section of a resilient bearing according to my invention. Fig. 2 is a plan view of a flat strip of elastic metal showing the spring tongues as partially cut out therein antecedently to shaping it into the split-ring with outwardly hooked elastic tongues which is shown in elevation in Fig. 3.

My improved resilient bearing comprises a hollow cylindric bushing 17 to removably fit upon a cylindric spindle such as is indicated by dotted lines at 19 in said Fig. 1. This bushing is positioned within the coaxial hollow of a relatively fixed boxing 7 such as is commonly used as part of the frame structure for a centrifugal cream separator mechanism in which said spindle 19 is that of a rotatable separator bowl.

The boxing 7 has a central raised annular part 11 within which is mounted in spaced relation coaxially said bushing 17 with its top part extending upwardly therefrom. A pressed annular cup 14 has its inner edge portion or margin embedded or cast in and around the upper portion of said bushing permanently to receive a porous gasket or filling 15, and the overarched top of the housing 8 has an orifice through which a liquid lubricant may be introduced to permeate said filling and issue thence to a sloping orifice in the bushing at 16 to lubricate its bearing surface. The outer zone of the bottom of the cupped part 14 is supported upon the upper edge of the annular part 11 of the boxing, and has a depending fixed pin 13 seated in a small cavity 12 in said part 11 to prevent relative rotation of the bushing when the spindle 19 is in rotation. The lower edge of the housing 8 is flanged outwardly horizontally and removably secured to said boxing by means of screws 9.

The outer circumferential part of the bushing 17 is formed with vertically spaced annular shoulders such as 18 to receive and releasably support a spring member which is preferably in the shape of a flat ring or a split ring 1 of cylindric form, having a plurality of pressed out tongues 2 and 3 extending longitudinally and directed alternately oppositely to each other.

Figure 3:
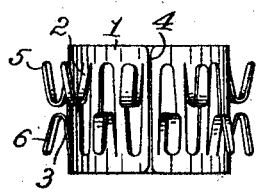

As shown in Fig. 3, each tongue is first bent outwardly angularly to the ring, and then bent or doubled over medially at a similar angle in V-shape to provide for said tongues 2 and 3 like but oppositely directed elastic hooked fingers 5 and 6 respectively opening oppositely relative to each other. By this construction, two annular rows of oppositely directed spring fingers are provided spaced longitudinally.

As shown in said Fig. 1, these elements are assembled with the split-ring 1 mounted upon said bushing and held in place by the shoulder 18, and with the hooked tongues 5 and 6 engaging the adjacent inner wall of the boxing under enough tension to compress said tongues flatly against said wall. This affords two annular zones of flatly contacting spring-fingers in engagement with the inner wall of the boxing whereby any sidewise movements of the bushing caused by slight irregularities in the rotation of the spindle 19 are yieldingly elastically damped by the two sets of spring-fingers in approximately radial lines of tension. As these zones of contact are longitudinally separated, the tensions of the tongues are equalized lengthwise of the bushing and spindle which conduces to keeping them in a true central axial position. As the hooked tongues are each relatively short in leverage, the oscillation thereof is minimized while preserving proper elasticity.

These bearing parts are covered and protected by the housing 8 which prevents entry of dust and assists in keeping the moving parts in place.

Having described my invention, what I claim as new, and desire to secure by Letters Patent, is:

A resilient bearing member, consisting of an elongated resilient plate formed into a flat split-ring, said plate being slitted at spaced intervals therealong to provide sets of like tongues of which the alternate tongues are directed oppositely to the other tongues, all the tongues extending transversely from near one longitudinal edge to near the other longitudinal edge, all the tongues being bent outwardly and reversely upon themselves to provide rows of open hooks with the rows respectively opening toward the longitudinal adjacent edges of the plate, and the respective sets of hooks being on opposite sides of a longitudinal zone of the plate.

Signed at Waterloo, Iowa, this 21st day of August, 1922.

JAMES McCOSH EDWARDS.